(12) United States Patent
Kubo (10) Patent No.: US 8,262,392 B2
(45) Date of Patent: Sep. 11, 2012

(54) HAIR DRESSING AND BEAUTY TECHNIQUE TRAINING DEVICE AND MODEL FOR HAIR DRESSING AND BEAUTY TECHNIQUE TRAINING

(75) Inventor: Yoshiaki Kubo, Yukuhashi (JP)

(73) Assignee: Hair Salon Zero Ltd, Fukuoka (JP)

( * ) Notice: Subject to any disclaimer, the term of this patent is extended or adjusted under 35 U.S.C. 154(b) by 393 days.

(21) Appl. No.: 12/377,456

(22) PCT Filed: Mar. 26, 2007

(86) PCT No.: PCT/JP2007/056168
§ 371 (c)(1),
(2), (4) Date: Feb. 19, 2009

(87) PCT Pub. No.: WO2008/023472
PCT Pub. Date: Feb. 28, 2008

(65) Prior Publication Data
US 2009/0275001 A1 Nov. 5, 2009

(30) Foreign Application Priority Data

Aug. 24, 2006 (JP) ................................. 2006-227270

(51) Int. Cl.
*G09B 19/10* (2006.01)
(52) U.S. Cl. .......................................................... 434/94
(58) Field of Classification Search .................... 434/94, 434/99, 267, 295, 296; 446/319, 321
See application file for complete search history.

(56) References Cited

U.S. PATENT DOCUMENTS

| | | | |
|---|---|---|---|
| 2,919,702 A | 1/1960 | Olivo | |
| 3,101,557 A * | 8/1963 | Watlington et al. | 434/94 |
| 4,370,137 A | 1/1983 | Herzig et al. | |
| 4,403,962 A * | 9/1983 | La Vista | 434/94 |
| 5,252,074 A * | 10/1993 | Passage et al. | 434/94 |
| 2003/0175663 A1* | 9/2003 | Fuchs | 434/94 |

FOREIGN PATENT DOCUMENTS

| | | | |
|---|---|---|---|
| FR | 2634042 | * | 1/1990 |
| FR | 2634042 A1 | | 1/1990 |
| FR | 2752700 A1 | | 3/1998 |
| FR | 2752700 | * | 6/1998 |
| JP | 42-019765 Y1 | | 11/1942 |
| JP | 57-047907 A | | 3/1982 |
| JP | 10-228232 A | | 8/1998 |
| JP | 2000-342333 A | | 12/2000 |

* cited by examiner

*Primary Examiner* — Kurt Fernstrom
(74) *Attorney, Agent, or Firm* — Sughrue Mion, PLLC (57) ABSTRACT

It is an object to provide a hair dressing and beauty technique training device by which the presence or absence of twist or angle shift in a horizontal direction when drawn by sandwiching between the fingers is easily found, thus a proper posture for haircutting and winding etc., may be determined by oneself, furthermore the proper posture and stance and positions of hands and scissors etc., so as not to cause twist or angle shift may be acquired and one's habits and what techniques he/she lacks may be determined objectively, thus basic techniques for proper haircutting and winding may be acquired in a short period of time, and moreover when artificial hair runs out, if hair is exchanged for new hair, the head model may be used repeatedly, and thus running costs may be reduced.

The hair dressing and beauty technique training device includes a securing portion 2 secured to a head model 100, a joint portion 3 formed in the securing portion 2, an attaching portion 6 formed detachably in the joint portion 3, and one or a plurality of strip-shaped portions 8 whose one end is connected to the attaching portion 6.

10 Claims, 7 Drawing Sheets

HAIR DRESSING AND BEAUTY TECHNIQUE TRAINING DEVICE AND MODEL FOR HAIR DRESSING AND BEAUTY TECHNIQUE TRAINING

TECHNICAL FIELD

The present invention relates to a hair dressing and beauty technique training device and a model for hair dressing and beauty technique training used when training for haircutting and winding is carried out.

BACKGROUND ART

Conventionally, when beauticians and barbers, particularly trainees and beginners for beauticians and barbers acquire haircutting techniques which are the basics of hair styling techniques and winding techniques to wind hair on rods for a perm, wigs for training obtained by implanting natural hair or hair of synthetic resin on a head model molded from synthetic resin material etc., have been used. When one trains for haircutting using a wig for training, posture, stance, eye level, angle for separating and taking hair, an angle for drawing the separated and taken hair by sandwiching hair between fingers and a length and angle for cutting with scissors, for making an intended hair style, are acquired by separating and taking a small portion of hair to be cut, drawing hair by sandwiching hair between the fingers and cutting drawn hair ends with scissors. Since these are combined and creatively used depending on the desired hair style, they are techniques which must be acquired first as basic techniques for haircutting.

However, beginners are not quite able to understand the relationship between the imaged hair style, and the angle for drawing the separated and taken hair and a haircutting position, and their posture and stance to the wig for training are unstable. Thus, when the separated and taken hair is drawn by sandwiching hair between the fingers, beginners do not change their posture and stance but often twist a bundle of hair to easily cut and do not keep the angle for drawing constant to make unraveled hair without realizing by it. Thus, a line or a plane formed by the ends of cut hair is often sawtoothed or waved. In the wig for training, without confirming the line or the plane formed by the ends of cut hair, one may not determine whether one's haircutting technique is good or not. Thus, beginners and trainees have not been able to determine their acquired levels of basic techniques such as posture and stance by themselves during their training for haircutting. Therefore, they have not been able to determine objectively what techniques they lack in them, and it has taken a long time to acquire basic techniques.

Meanwhile, an instructor who teaches these techniques to beginners instructs basic techniques such as posture, stance and angle for drawing the separated and taken hair by sandwiching hair between the fingers by observing their haircutting movement for the intended hair style. These techniques have been acquired by the instructor's own experience. Thus, it has been extremely difficult to objectively teach these techniques to trainees and beginners. The trainees and beginners given instruction have not also been quite able to understand because no standard to objectively determine the suitability of their haircutting movement has been available. Thus, it has taken a long time to acquire basic techniques.

As a conventional training device for haircutting, for example, a "haircut training device having a human head model main body of a full size having no head hair and a hair body implanting hair on a substrate formed into a square-shaped etc., which partially covers a head hair portion on the human head model main body, wherein the substrate of the hair body is formed detachably for the human head model main body and a plurality of hair bodies are combined to entirely cover the head hair portion on the human head model main body as a whole" disclosed in (Patent Document 1) has been known.

In (Patent Document 2), a "haircut training device composed of a sheet formed to have a width of 5 to 8 cm and bound with a cord inserted into a hole formed at an upper end center portion" has been described.

Patent Document 1: Japanese Published Unexamined Patent Application No. 2000-342333
Patent Document 2: Japanese Published Unexamined Patent Application No. H10-228232

DISCLOSURE OF THE INVENTION

Problem to be Solved by the Invention

However, the above conventional technology has had the following problems.

(1) The technology disclosed in (Patent Document 1) solves the problem that since conventionally hair is fixedly attached on the human head model main body, when all of the hair is used up by haircut training, the technology is for solving the problem that the human head model main body must be discarded, thus costs increase and in particular, the haircut training at a certain site may not be repeated. Thus, the substrate of the hair body is formed detachably to the human head model main body and the hair body used up is appropriately replaced, thereby allowing for training by repeatedly using the human head model main body. However, since the hair implanted on the substrate formed into the square-shaped etc., is like a thick bundle, the movement itself that the hair is separated and taken, drawn by sandwiching hair between the fingers and cut is the same as that in the case of using the conventional wig for training. Thus, without confirming the line or the plane formed by the cut hair ends, it may not be determined whether one's haircutting technique is good or not. Therefore, beginners and trainees have not been able to determine their acquired levels of basic techniques such as posture and stance by themselves during their training for haircutting. Therefore, they have not been able to determine objectively what techniques they lack, and it has taken a long time to acquire basic techniques.

(2) In the technology disclosed in (Patent Document 2), the cost for preparing natural or artificial hair may be reduced as well as the haircut training device where it is easy to clean up after the haircut training may be provided. However, this is only for training on the manipulation of scissors by pulling and taking a sheet from a cord upon training, sandwiching it between the fingers of one hand, and moving the scissors in the other hand to cut along a straight line or a curve depicted on the sheet. Therefore, there has been a problem that the basics of haircutting techniques with regard to what angle hair is drawn and where hair is to be cut for making the intended hair style may not be acquired. There has been a problem that it is possible to learn how to use scissors, but how to use the body, e.g., posture and stance for drawing hair, which is most important, is not possible to be acquired.

The present invention has solved the above conventional problems, and an object thereof is to provide a hair dressing and beauty technique training device by which basic techniques for proper haircutting and winding may be acquired in a short period of time, an instructor may objectively teach basic techniques to instruct effectively, and where when artificial hair runs out, if old hair is exchanged for new hair, a head model may be used repeatedly to reduce running costs, because the presence or absence of twist or angle shift in a horizontal direction when hair is drawn by sandwiching hair between the fingers is easily found, thus a proper posture for haircutting and winding etc., may be determined by oneself, further it is possible to acquire the proper posture and stance, and positions of hands and scissors, etc., so as not to cause twist or angle shift, and one's habits and what techniques he/she lacks may be determined objectively.

Also, an object of the present invention is to provide a model for hair dressing and beauty technique training, where it is possible to train basic techniques of haircutting and winding by attaching the hair dressing and beauty technique training device.

Means for Solving the Problem

The hair dressing and beauty technique training device and the model for hair dressing and beauty technique training using the same of the present invention for solving the above conventional problems have the following constitutions.

The hair dressing and beauty technique training device described in the First Aspect of the present invention has the constitution including a fixedly attaching portion fixedly attached turnably to a portion to be fixedly attached formed on a surface of a head model in a horizontal direction of the surface of the head model and one or a plurality of strip-shaped portions whose one end is connected to the fixedly attaching portion.

This constitution affords the following actions.
(1) Because of including the fixedly attaching portion fixedly attached detachably to the head model and one or the plurality of strip-shaped portions whose one end is connected to the fixedly attaching portion, the strip-shaped portion has a wide width and a thin thickness. Thus, if there is a twist or angle shift in the horizontal direction when the strip-shaped portion is drawn by sandwiching hair between the fingers, the strip-shaped portion may be loosened. Thus, the presence or absence of twist or angle shift may be determined by oneself, and further the proper posture and stance, and the positions of hands and scissors etc., so as not to cause twist or angle shift of the strip-shaped portion may be acquired, and one's habits and what techniques he/she lacks may be determined objectively. Therefore, basic techniques for proper haircutting and winding may be acquired in a short period of time.
(2) The instructor who teaches basic techniques for haircutting and winding may also instruct posture and stance, and the positions of hands and scissors, etc., so as not to twist the strip-shaped portion and so as to draw the strip-shaped portion without angle shift in the horizontal direction, and thus may teach basic techniques objectively. Also, trainees and beginners given instruction may easily understand the proper movements for haircutting and winding because they may determine the suitability of their movements for haircutting and winding objectively. Thus, they may acquire basic techniques for haircutting in a short period of time.
(3) Because of including the fixedly attaching portion which is fixedly attached detachably to the head model, when the strip-shaped portion runs out, if the hair dressing and beauty technique training device is exchanged for a new one, the head model may be used repeatedly to reduce running costs.

Here, as the head model, one where the hair is not implanted is used.

As the fixedly attaching portion, one which is formed into a plane shape, a strip shape or a dot-like shape, etc., and formed detachably to the head model may be used.

As a means to make the fixedly attaching portion detachable to the head model, one which adsorbs by a sucking force, e.g., a sucking disc, etc., and one which adheres by an adhesive tape etc., may be used. Also, it is possible to use that etc., which allows attaching and detaching the fixedly attaching portion by fitting, inserting, screwing, magnetizing, attaching in a sandwiched manner with a clip etc., or pasting to/from the head model where a portion to be fixedly attached, e.g., a concave portion, a convex portion, a hole portion, a screw portion, a plane-shaped zipper or an embedded magnetic material, etc., has been formed.

As the strip-shaped portion, that made by forming into a strip shape having a wide width and a thin thickness from soft synthetic resin, rubber, paper, metal foil, hair or artificial hair, etc., may be used. This is because these are used to resemble a bundle of hair when hair is separated and taken.

As the width of the strip-shaped portion, a width of 2 to 5 cm which is roughly equal to the width of the bundle of hair drawn by sandwiching hair between the fingers is suitably used. As the width of the strip-shaped portion becomes narrower than 2 cm, a tendency that it becomes difficult to determine whether the drawn strip-shaped portion is twisted or not is observed. As it becomes wider than 5 cm, the tendency that the strip-shaped portion is difficult to be held between the fingers and its feel is different from actual haircutting and winding is observed. Thus, both cases are not preferable.

The length of the strip-shaped portion is not particularly limited as long as it is longer than one cut by scissors, and the length of 5 to 30 cm may be suitably used. As the strip-shaped portion becomes shorter than 5 cm, it is difficult to determine whether the strip-shaped portion is twisted or not when the strip-shaped portion is drawn by sandwiching it between the fingers, and the tendency that it does not become suitable for haircutting and winding training is observed, as well as a cuttable frequency is reduced. As the strip-shaped portion becomes longer than 30 cm, twist or angle shift in the horizontal direction occurs easily, and the tendency that it is not suitable for training is observed. Thus, both cases are not preferable.

One or a plurality of strip-shaped portions may be connected to the fixedly attaching portion. The plurality of strip-shaped portions may be closed up to one base or each one may be dispersed and connected to a different base.

In the strip-shaped portion, a straight or curved reference line for haircutting roughly orthogonal or obliquely to a length direction of the strip-shaped portion may be displayed. By cutting along the reference line for haircutting, it is possible to train how to use scissors and train for the angle to be cut.

The hair dressing and beauty technique training device described in the Second Aspect of the present invention has the constitution including a fixedly attaching portion fixedly attached detachably to a surface of a head model by holding in a sandwiched manner a portion to be fixedly attached formed of a protruding ridge portion, a joint portion formed in the fixedly attaching portion, and one or a plurality of strip-shaped portions whose one end is connected turnably to the joint portion in a horizontal direction of the surface of the head model.

This constitution affords the following action.
(1) The angle of the strip-shaped portion in the horizontal direction may be changed and it may be acquired that the position and posture of one's own body are changed depending on the angle of the strip-shaped portion, and the basic movement when a different cutting method is adopted in each section may be acquired.

The hair dressing and beauty technique training device may have the constitution including a securing portion secured to the head model, a joint portion formed in the securing portion, an attaching portion formed turnably in the joint portion, and one or a plurality of strip-shaped portions whose one end is connected to the attaching portion.

This constitution affords the following actions.

(1) Because of including the attaching portion formed turnably to the joint portion and one or the plurality of strip-shaped portions whose one end is connected to the attaching portion, and as the strip-shaped portion has a wide width and a thin thickness, if there is a twist or angle shift in the horizontal direction when the strip-shaped portion is drawn by sandwiching it between the fingers, the strip-shaped portion may be loosened. Thus, the presence or absence of the twist or angle shift may be determined by oneself, and further the proper posture and stance, and the positions of hands and scissors, etc., so as not to cause twist or angle shift of the strip-shaped portion may be acquired, and one's habits and what techniques he/she lacks may be determined objectively. Therefore, basic techniques for proper haircutting and winding may be acquired in a short period of time. Also, the attaching portion is formed turnably to the joint portion of the securing portion. Thus, the strip-shaped portion may be arranged in the orthogonal direction or the oblique direction, it may be acquired that the position and the posture of one's own body are changed depending on the angle of the strip-shaped portion, and the basic movement when a different cutting method is adopted in each section may be acquired.

(2) The instructor who teaches basic techniques for haircutting and winding may also instruct the posture and stance, and the positions of hands and scissors, etc., so as not to twist the strip-shaped portion and so as to draw the strip-shaped portion without angle shift in the horizontal direction, and thus may teach basic techniques objectively. Also, trainees and beginners given instruction may easily understand the proper movements for haircutting and winding because they may determine the suitability of their movements for haircutting and winding objectively. Thus, they may acquire basic techniques for haircutting and winding in a short period of time.

(3) Because of including the attaching portion fixedly attached detachably to the joint portion, when the strip-shaped portion runs out, if the strip-shaped portion is exchanged for a new one, the head model and the securing portion may be used repeatedly to reduce running costs.

Here, the head model and the strip-shaped portion are the same as those described in the First Aspect, and thus explanations thereof are omitted.

As the securing portion, one which is formed into the plane shape, the strip shape or the dot-like shape etc., and formed detachably to the head model, or fixedly attached to the head model is used.

As the means to make the attaching portion detachable to the joint portion, one which adsorbs by decompression with the sucking disc etc., and by the sucking force with magnetic force etc., and one which adheres by the adhesive tape etc., may be used. Also, it is possible to use that which allows attaching and detaching the attaching portion to/from the securing portion where the joint portion, e.g., the concave portion, the convex portion or the plane-shaped zipper etc., has been formed.

The hair dressing and beauty technique training device may have the constitution including a securing portion secured to the head model, a joint portion formed turnably in the securing portion, an attaching portion formed detachably in the joint portion, and one or a plurality of strip-shaped portions whose one end is connected to the attaching portion.

This constitution affords the following action.

(1) Since the attaching portion is formed turnably to the joint portion in the securing portion, the strip-shaped portion may be arranged in the orthogonal direction or the oblique direction. Thus, it may be acquired that the position and the posture of one's own body is changed depending on the angle of the strip-shaped portion, and the basic movement when a different cutting method for each section is adopted may be acquired.

The invention described in the Third Aspect of the present invention is the hair dressing and beauty technique training device described in the First or the Second Aspect, and has the constitution including an immovable attaching portion which is extended or joined to any of the fixedly attaching portion or the joint portion, in which the strip-shaped portion is immovably attached detachably to the immovable attaching portion.

This constitution affords the following action in addition to the actions obtained in the First or the Second Aspect.

(1) Since the strip-shaped portion is immovably attached detachably to the immovable attaching portion which is extended or joined to any of the fixedly attaching portion or the joint portion, only the strip-shaped portion may be exchanged. Thus, when the strip-shaped portion runs out, if only the strip-shaped portion is exchanged for a new one, the fixedly attaching portion may be repeatedly used to reduce running costs.

Here, as the immovable attaching portion, a clip which attaches in a sandwiched manner at one end side of the strip-shaped portion, or a rod-shaped member or a plate-shaped member etc., inserted into a sack-shaped portion of the strip-shaped portion formed so as to make the one end side of the strip-shaped portion sack-shaped is used.

The invention described in the Fourth Aspect of the present invention is the hair dressing and beauty technique training device described in any one of the First to the Third Aspects, and has the constitution including (a) a hard plate-shaped portion which is provided with the fixedly attaching portion and to which one end of the strip-shaped portion is secured, or (b) a hard plate-shaped portion formed at the one end side of the strip-shaped portion and immovably attached to the immovable attaching portion.

This constitution affords the following action in addition to the actions obtained in any one of the First to the Third Aspects.

(1) Because of having the hard plate-shaped portion to which one end of the strip-shaped portion is secured or which is formed at the one end side of the strip-shaped portion, the presence or absence of twist or angle shift of the strip-shaped portion when the strip-shaped portion is drawn by sandwiching it between the fingers may be easily determined visually on the basis of the plate-shaped portion.

Here, the plate-shaped portion may be used without particularly limitation as long as it is harder than the strip-shaped portion. For example, that formed of synthetic hard resin, hard rubber, metal or paper etc., may be used. One obtained by applying an adhesive on the base of the strip-shaped portion and curing it may be used. The immovable attaching portion formed of the clip etc., may also be used as the plate-shaped portion. The strip-shaped portion reinforced with the immovable attaching portion may also be used as the plate-shaped portion.

The length of the plate-shaped portion may be 1 mm to 5 cm, and preferably 1 cm to 3 cm. As the length of the plate-shaped portion becomes shorter than 1 cm, the tendency that it becomes difficult that the twist or shift are visually determined on the basis of the plate-shaped portion is observed. As the length becomes longer than 3 cm, the tendency that it becomes difficult that the twist or angle shift of the strip-shaped portion are determined because the plate-shaped portion is also bended and deformed when the strip-shaped portion is drawn is observed. In particular, when the plate-shaped portion becomes shorter than Lmm or longer than 5 cm, these tendencies become remarkable, and thus, are not preferable.

The invention described in the Fifth Aspect of the present invention is the hair dressing and beauty technique training device described in any one of the First to the Fourth Aspects; and has the constitution where a first angle scale is displayed on the surface of the fixedly attaching portion or the surface of the head model.

This constitution affords the following action in addition to the actions obtained in any one of the First to the Fourth Aspects.

(1) Since the first angle scale is displayed on the surface of the fixedly attaching portion or the surface of the head model, the angle of the strip-shaped portion turned to the fixedly attaching portion may be read out, and the relationship of the angle of the strip-shaped portion with the position and the posture of one's own body may be acquired.

Here, as the first angle scale, the scale displayed radially from a turn center of the strip-shaped portion, the joint portion and the attaching portion is used. The angle may be represented by numerals, but the scale may be simply represented by lines or dots.

The invention described in the Sixth Aspect of the present invention is the hair dressing and beauty technique training device described in any one of the First to the Fifth Aspects, and has the constitution including an indication plate provided to the strip-shaped portion in addition and a second angle scale displayed on the indication plate.

This constitution affords the following action in addition to the actions obtained in any one of the First to the Fifth Aspects.

(1) Because of including the indication plate provided to the strip-shaped portion in addition and a second angle scale displayed on the indication plate, when the training is carried out by assuming that the angle to draw hair is changed or the hair is drawn at a constant angle, it may be understood what angle the hair is drawn at, and thus the relationship of the angle to draw with the posture and stance may be acquired.

Here, as the indication plate, one which is roughly orthogonal to a width direction of the strip-shaped portion and is provided in a standing manner to the fixedly attaching portion or the securing portion and one which is arranged in the joint portion or the plate-shaped portion etc., which are provided in addition laterally to the strip-shaped portion, are used. This is because it is possible to measure the angle of the strip-shaped portion against the fixedly attaching portion, the securing portion or the plate-shaped portion.

As the second angle scale, the scale displayed radially from the base of the strip-shaped portion is used. Also when the strip-shaped portion is secured to the plate-shaped portion, the scale displayed radially from the base of the strip-shaped portion secured to the plate-shaped portion is used. The angle may be represented by numerals, but the scale may be simply represented by lines or dots.

A model for hair dressing and beauty technique training described in the Seventh Aspect of the present invention has the constitution composed of a head model, being formed of concave portions, convex portions, hole portions, screw portions, protruding ridge portions or magnetic materials in a plurality of sites on a surface appropriately spaced from one another, and comprising the portion to be fixedly attached, to which the fixedly attaching portion of the hair dressing and beauty technique training device according to any one of the First to the Sixth Aspects is fixedly attached.

This constitution affords the following action.

(1) Because of including the portion to be fixedly attached, to which the fixedly attaching portion of the hair dressing and beauty technique training device is fixedly attached, basic techniques for haircutting and winding may be trained by attaching the hair dressing and beauty technique training device.

Here, as the model for hair dressing and beauty technique training, one where the portion to be fixedly attached, to which the fixedly attaching portion or the securing portion of the hair dressing and beauty technique training device is fixedly attached or secured is formed on the surface of the head model is used. Also, it is possible to use one including a depositing portion formed in a depositable manner on an existing head model etc., on a backside of a model main body where the portion to be fixedly attached has been formed on the surface. It is also possible to use the head model having the portion to be fixedly attached, and formed of synthetic resin or metal etc., in a thin-walled shape from a hair line over the back of the head.

As the portion to be fixedly attached, that formed by a concave portion, a convex portion, a hole portion, a screw portion, a plane-shaped zipper or a magnetic material etc., and where the fixedly attaching portion or the securing portion is made detachable by attaching in a sandwiched manner with the clip etc., fitting, inserting, screwing, magnetizing or adherence may be used.

Effects of the Invention

As the above, according to the hair dressing and beauty technique training device and the model for hair dressing and beauty technique training using the same in the present invention, the following advantageous effects are obtained.

According to the invention described in the First Aspect,
(1) Since the strip-shaped portion has the wide width, the presence or absence of twist or angle shift in the horizontal direction when the strip-shaped portion is drawn by sandwiching it between the fingers may be determined by oneself, further, the proper posture and stance, and the positions of the hands and scissors, etc., so as not to cause twist or angle shift of the strip-shaped portion may be acquired and one's habits and what techniques he/she lacks may be determined objectively. Thus, it is possible to provide the hair dressing and beauty technique training device by which basic techniques for proper haircutting and winding may be acquired in a short period of time.

(2) The instructor who teaches basic techniques for haircutting and winding may instruct the posture and stance, and the positions of hands and scissors etc., so as not to twist the strip-shaped portion and so as to draw the strip-shaped portion without angle shift in the horizontal direction, and thus may teach basic techniques objectively. Also, trainees and beginners given instruction may easily understand them. Thus, it is possible to provide the hair dressing and beauty technique training device by which they may acquire basic techniques for haircutting etc., in a short period of time.

(3) It is possible to provide the hair dressing and beauty technique training device that when the strip-shaped portion runs out, if the hair dressing and beauty technique training device is exchanged for a new one, the head model may be used repeatedly to reduce running costs.

(4) The hair dressing and beauty technique training device by which since the fixedly attaching portion is turnable, trainees, etc., may acquire changing the positions and posture of their body depending on the turning angle and the basic movement when a different cutting method is adopted in each section may be acquired may be provided.

According to the invention described in the Second Aspect,
(1) Since the strip-shaped portion is formed turnably to the fixedly attaching portion, it is possible to provide the hair dressing and beauty technique training device by which the angle of the strip-shaped portion in the horizontal direction may be changed, it may be acquired that the position and posture of one's own body are changed depending on the angle of the strip-shaped portion, and the basic movement when a different cutting method is adopted in each section may be acquired.

According to the invention described in the Third Aspect, in addition to the effects in the First or the Second Aspect,
(1) Since the strip-shaped portion is immovably attached detachably to the immovable attaching portion, which is extended or joined to any of the fixedly attaching portion or the joint portion, only the strip-shaped portion may be exchanged. Thus, it is possible to provide the hair dressing and beauty technique training device that when the strip-shaped portion runs out, if only the strip-shaped portion is exchanged for a new one, the fixedly attaching portion may be repeatedly used to reduce running costs.

According to the invention described in the Fourth Aspect, in addition to any one of the effects in the First to the Third Aspects,
(1) Because of having the hard plate-shaped portion to which one end of the strip-shaped portion is secured or which is formed at the one end side of the strip-shaped portion, it is possible to provide the hair dressing and beauty technique training device by which the presence or absence of twist or angle shift of the strip-shaped portion when the strip-shaped portion is drawn by sandwiching it between the fingers may be easily determined visually on the basis of the plate-shaped portion.

According to the invention described in the Fifth Aspect, in addition to any one of the effects in the First to the Fourth Aspects,
(1) Since the first angle scale is displayed on the surface of the fixedly attaching portion or the surface of the head model, it is possible to provide the hair dressing and beauty technique training device by which the angle of the strip-shaped portion turned to the fixedly attaching portion or the securing portion may be read out, and the relationship of the angle of the strip-shaped portion with the position and the posture of one's own body may be acquired.

According to the invention described in the Sixth Aspect, in addition to any one of the effects in the First to the Fifth Aspects,
(1) Because of including the indication plate provided in addition to the strip-shaped portion and the second angle scale displayed on the indication plate, it is possible to provide the hair dressing and beauty technique training device by which when the training is carried out by assuming that the angle to draw the hair is changed or the hair is drawn at a constant angle, it may be understood what angle the hair is drawn at, and thus the relationship of the angle to draw with the posture and stance may be acquired.

According to the invention described in the Seventh Aspect,
(1) It is possible to provide the model for hair dressing and beauty technique training by which basic techniques for haircutting and winding may be trained by attaching the hair dressing and beauty technique training device.

DESCRIPTION OF SYMBOLS 1, 11, 11', 11a, 21, 31, 41, 51, 61, 71: Hair dressing and beauty technique training device
2, 22, 62: Securing portion
3, 23, 63, 73: Joint portion
4, 24, 67: First angle scale
5: Fitting concave portion
6, 14b, 27, 66: Attaching portion
7, 15, 43: Plate-shaped portion
8, 14, 14a, 26, 33, 44, 56, 63, 65, 76: Strip-shaped portion
9: Reference line for haircut
12, 12a, 32, 42, 52, 62, 72: Fixedly attaching portion
12b: Axis portion
12c: Flange portion
12d: Screw portion
12e: Fastening member
13, 13a, 75: Immovable attaching portion
13b, 25, 64: Escape prevention portion
13c: Holding portion
53: Indication plate
54: Cut line portion
55: Second angle scale
74: Fitting portion
100, 104, 109: Head model
101: Standard line 102, 110: Model for hair dressing and beauty technique training
103, 111: Model main body
104: Tube portion
105, 112: Portion to be fixedly attached
106: Indication plate
107: Fitting insertion hole portion
108: First angle scale
120: Model for hair dressing and beauty technique training
121: Model main body
122: Base portion
123: Supporting head fitting insertion hole portion
124: Portion to be fixedly attached
130: Mounting table
131: Supporting head

BEST MODES FOR CARRYING OUT THE INVENTION

Best modes for carrying out the present invention will be described below with reference to the drawings.

Embodiment 1

Figure 1A:
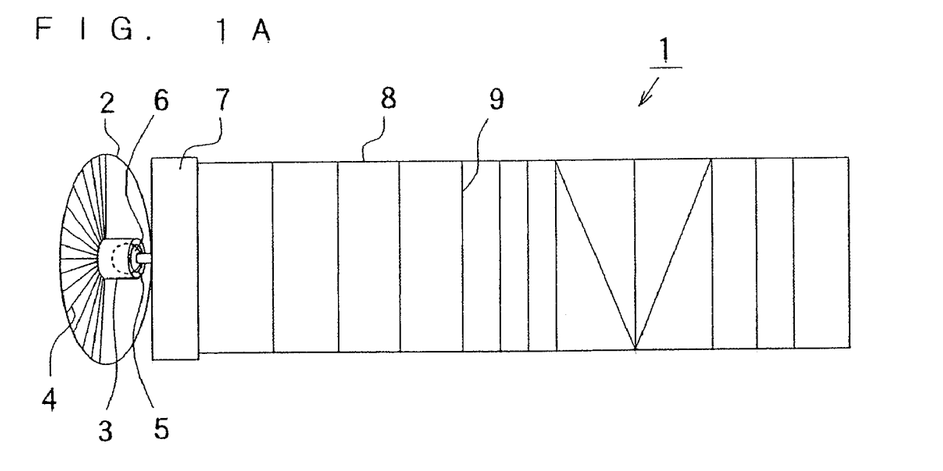
FIG. 1A is a perspective view of a hair dressing and beauty technique training device in Embodiment 1.
Figure 1B:
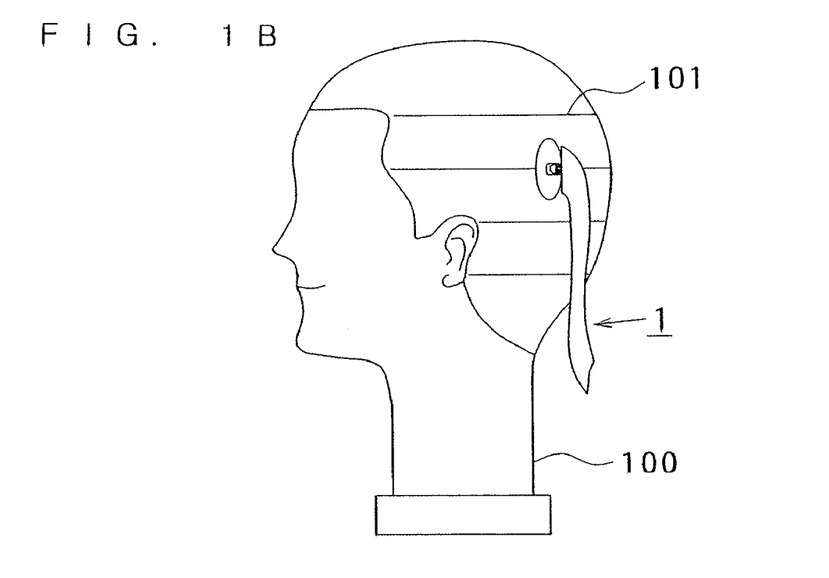
FIG. 1B is a perspective view showing a state where the hair dressing and beauty technique training device has been fixedly attached to a head model.

FIG. 1A is a perspective view of a hair dressing and beauty technique training device in Embodiment 1 of the present invention, and FIG. 1B is a perspective view showing a state where the hair dressing and beauty technique training device has been fixedly attached to a head model.

In the figures, reference numeral 1 denotes the hair dressing and beauty technique training device in Embodiment 1, 2 denotes a securing portion formed into a roughly circle plane-shaped body such as a sucking disc, 3 denotes a joint portion provided in a protruding manner at roughly the center on the surface of the securing portion 2, 4 denotes a first angle scale evenly spaced and displayed radially with centering on the joint portion 3 at roughly half of the surface of the securing portion 2, 5 denotes a fitting concave portion formed into a roughly hemispherical concave shape on a top portion of the joint portion 3, 6 denotes a roughly spherical attaching portion formed from synthetic resin or metal etc., and fitted detachably to the fitting concave portion 5 in the joint portion 3, 7 denotes a hard plate-shaped portion formed from hard synthetic resin etc., and extended to the attaching portion 6, 8 denotes a strip-shaped portion formed into a thin sheet having a wide width from soft synthetic resin, rubber, paper or metal foil etc., and whose one end is secured to the plate-shaped portion 7 and connected to the attaching portion 6, 9 denotes a straight reference line for haircutting displayed roughly orthogonal or obliquely to a length direction of the strip-shaped portion 8, 100 denotes a head model to which no hair is implanted, and 101 denotes standard lines demarcated with a predetermined interval in the horizontal direction from the nape to the top and displayed on the head model 100.

It is noted that in the present embodiment, the size of the attaching portion 6 is formed to be roughly the same as the size of the fitting concave portion 5 in the joint portion 3, and the attaching portion 6 is firmly fitted to the fitting concave portion 5 in the joint portion 3. Thus, if the plate-shaped portion 7 is gripped and moved, the attaching portion 6 may be turned, but even if the strip-shaped portion 8 is sandwiched and drawn, the force is difficult to be transmitted to the attaching portion 6. Thus, the attaching portion 6 is formed so that it may not turn. The strip-shaped portion 8 is formed to have a width of 2 to 5 cm and a length of 5 to 30 cm. The plate-shaped portion 7 is formed to have a length of 1 mm to 5 cm.

For the hair dressing and beauty technique training device constituted as above in Embodiment 1 of the present invention, a method for using it will be described below.

Trainees etc., who train for the hair dressing and beauty techniques secure the securing portion 2 of the hair dressing and beauty technique training device 1 to the head model 100 by suction or adherence etc., with reference to the standard lines 101, then grips the plate-shaped portion 7 and adjusts to provide in a hanging manner to the securing portion 2. First, the trainee trains on movements where the strip-shaped portion 8 is sandwiched between the fingers and a bundle of hair separated and taken is drawn at a predetermined angle to the horizontal direction. At that time, the trainee improves the posture and stance so as not to twist and loosen the strip-shaped portion 8 and so as not to shift the drawing angle of the strip-shaped portion 8 to the horizontal direction. Thereby, it is possible to acquire the posture and stance, and the positions of the hands and scissors, etc., for the proper haircutting. Subsequently, it is possible to acquire how to use scissors by cutting the ends of the strip-shaped portion 8 protruded between the fingers with scissors along the reference line 9 for haircutting.

When the strip-shaped portion 8 is pulled up straightforward to the plate-shaped portion 7 and when the strip-shaped portion 8 is pulled up obliquely to the plate-shaped portion 7, by improving the posture and stance so as not to twist or loosen the strip-shaped portion 8, it is possible to acquire the posture and stance for the proper haircutting in each case of gradation, same layer and high layer etc.

Also, by gripping the plate-shaped portion 7 and turning the attaching portion 6 in the horizontal direction for the joint portion 3 with reference to the first angle scale 4, and subsequently training similarly, it may be acquired that the position and the posture of one's own body are changed depending on the angle of the turned strip-shaped portion 8.

It is noted that by training for winding of rods for a perm using the strip-shaped portion 8, it is possible to train the winding.

Since the hair dressing and beauty technique training device in Embodiment 1 of the present invention is constituted as above, the following actions may be obtained.

(1) Because of including the attaching portion 6 formed detachably to the joint portion 3 and the strip-shaped portion 8 whose one end is connected to the attaching portion 6 via the plate-shaped portion 7, and as the strip-shaped portion 8 is the thin sheet and has the wide width, the presence or absence of twist or angle shift in the horizontal direction of the strip-shaped portion 8 when the strip-shaped portion 8 is drawn by sandwiching it between the fingers is easily found. Thus, the twist or shift of the strip-shaped portion 8 may be determined by oneself. Further, the proper posture and stance, and the positions of the hands and scissors, etc., so as not to cause twist or shift of the strip-shaped portion 8 may be acquired. And one's habits and what techniques he/she lacks may be determined objectively. Therefore, basic techniques for proper haircutting may be acquired in a short period of time.

(2) The instructor who teaches basic techniques for haircutting may also instruct the posture and stance etc., so as to draw the strip-shaped portion 8 without twist or shift, and thus may teach basic techniques objectively. Also, trainees and beginners given instruction may easily understand the proper movements for haircutting because they may determine the suitability of their movements for haircutting objectively. Thus, they may acquire basic techniques for haircutting in a short period of time.

(3) Because of including the attaching portion 6 fixedly attached detachably to the joint portion 3, when the strip-shaped portion 8 runs out, if only the strip-shaped portion 8 is exchanged for a new one, the head model 100 and the securing portion 2 may be repeatedly used to reduce running costs.

(4) Since the reference line 9 for haircutting is displayed in the strip-shaped portion 8, by cutting along the reference line 9 for haircutting, it is possible to train how to use scissors and train the angle to be cut.

(5) Since the attaching portion 6 is formed turnably to the joint portion 3 in the securing portion 2, the strip-shaped portion 8 may be arranged in the orthogonal direction or the oblique direction to the standard line 101. Thus, it may be acquired that the position and the posture of one's own body are changed depending on the angle of the strip-shaped portion 8, and the basic movement when a different cutting method for each section is adopted may be acquired.

(6) Since the first angle scale 4 is displayed on the surface of the securing portion 2, the angle of the turned strip-shaped portion 8 may be read out and the relationship of the angle of the strip-shaped portion 8 with the position and the posture etc., of one's own body may be acquired.

(7) Since one end of the strip-shaped portion 8 is secured to the hard plate-shaped portion 7, the presence or absence of twist or angle shift of the strip-shaped portion 8 when the strip-shaped portion 8 is drawn by sandwiching it between the fingers may be easily determined visually on the basis of the plate-shaped portion 7.

(8) Since the width of the strip-shaped portion 8 is formed to be 2 to 5 cm, the strip-shaped portion 8 is easily drawn by sandwiching it between the fingers, and it is easily determined whether the drawn strip-shaped portion 8 twists or not. Since the length of the strip-shaped portion 8 is formed to be 5 to 30 cm, the trainee etc., easily handles it, and it is easily determined whether the drawn strip-shaped portion 8 twists or not. Since the length of the plate-shaped portion 7 is formed to be 1 mm to 5 cm, twist or shift is easily determined visually on the basis of the plate-shaped portion 7.

Here in the present embodiment, the cases where one strip-shaped portion 8 is secured to the plate-shaped portion 7 have been described, but the plurality of strip-shaped portions are secured in some cases. In these cases, the same actions may be obtained as well as the overlapped strip-shaped portions 8 are thickened. Thus, there may be an action that the feel close to the thickness of the bundle of hair may be obtained.

Also, the cases where the securing portion 2 is formed detachably on the head model 100 by adherence or suction etc., have been described, but the securing portion 2 is completely fixedly attached by adhesion etc., in some cases. In these cases, since the attaching portion 6 is formed detachably to the joint portion 3, the same actions may be obtained.

The cases where the strip-shaped portion 8 is formed into the thin sheet shape having the wide width from soft synthetic resin, rubber, paper or metal foil etc., have been described, but those obtained by fixedly attaching one end portion of a plurality of hair or a filamentous matter made from synthetic resin to the plate-shaped portion 7 to form into a strip shape like a thin bundle are used in some cases. In these cases, the same actions may be obtained.

Embodiment 2

Figure 2A:
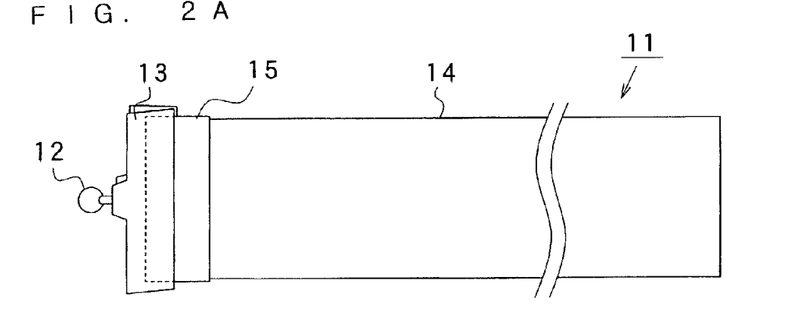
FIG. 2A is a perspective view of a hairdressing and beauty technique training device in Embodiment 2.
Figure 2B:
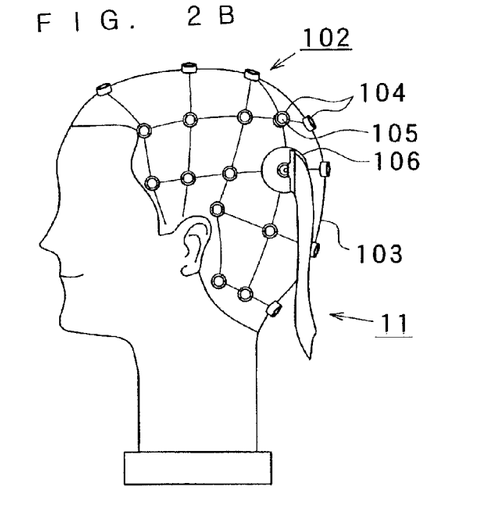
FIG. 2B is a side view showing a model for hair dressing and beauty technique training, to which the hair dressing and beauty technique training device has been fixedly attached.
Figure 2C:
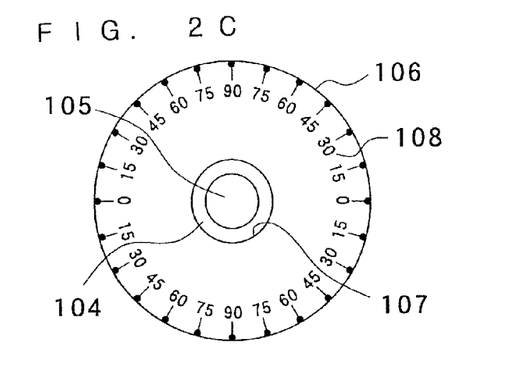
FIG. 2C is a plain view showing an indication plate of a first angle scale.
Figure 2D:
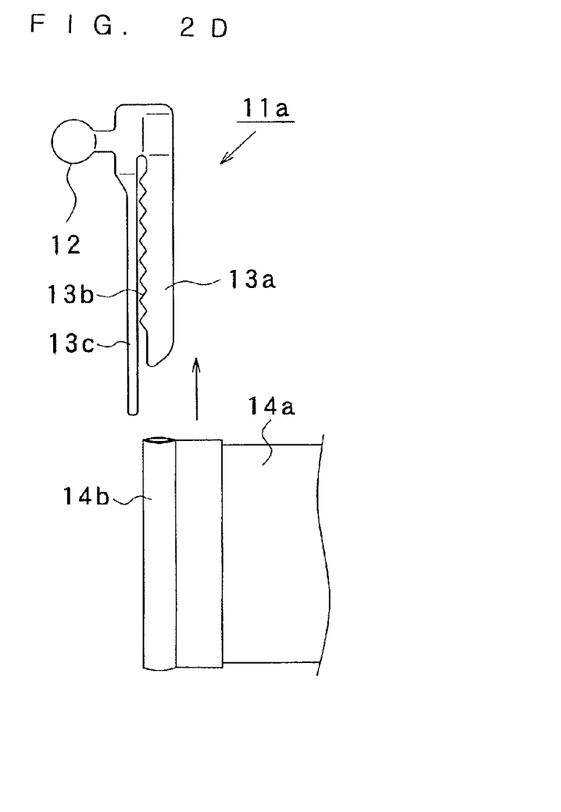
FIG. 2D is a substantial part side view of a hair dressing and beauty technique training device of a Modified Example.

FIG. 2A is a perspective view of a hair dressing and beauty technique training device in Embodiment 2 of the present invention, FIG. 2B is a side view showing a model for training hair dressing and beauty technique, to which the hair dressing and beauty technique training device has been fixedly attached, FIG. 2C is a plain view showing an indication plate displaying a first angle scale, and FIG. 2D is a substantial part side view of a hair dressing and beauty technique training device of a Modified Example.

In FIG. 2A, reference numeral 11 denotes the hair dressing and beauty technique training device in Embodiment 2 of the present invention, 12 denotes a fixedly attaching portion formed into a roughly spherical shape, 13 denotes an immovable attaching portion formed from hard synthetic resin or metal, and composed of the clip extended to the fixedly attaching portion 12, 14 denotes a strip-shaped portion formed into the thin strip shape having the wide width from soft synthetic resin, rubber, paper or metal foil etc., and 15 denotes a plate-shaped portion formed at the one end side of the strip-shaped portion 14 from synthetic resin, hard rubber, metal or paper etc., and attached in a sandwiched manner with the immovable attaching portion 13.

In FIGS. 2B and 2C, reference numeral 102 denotes the model for hair dressing and beauty technique training, composed of the head model in Embodiment 2, 103 denotes a model main body of the head model in the model 102 for hair dressing and beauty technique training, 104 denotes a tube portion inserted into a plurality of hole portions formed in each section such as a front, a top, a side and a nape in the model main body 103 and whose tip side protrudes from the head surface, 105 denotes a portion to be fixedly attached, formed in the tube portion 104 and composed of the fitting concave portion to which the fixedly attaching portion 12 of the hair dressing and beauty technique training device 11 is fitted, 106 denotes an indication plate of a first angle scale formed into the disc, 107 denotes a fitting insertion hole portion into which the tube portion 104 formed at roughly the center of the indication plate 106 is fitted and inserted, and 108 denotes the first angle scale formed at the periphery of the indication plate 106.

In FIG. 2D, reference numeral 11a denotes the hair dressing and beauty technique training device in a Modified Example, 13a denotes an immovable attaching portion composed of a hard plate-shaped member extended in a roughly L shape from the fixedly attaching portion 12 formed into a roughly spherical shape from the synthetic resin etc., 13b denotes an escape prevention portion formed by knurling or concavoconvex cut etc., at the periphery of a fixedly attaching portion 12 side of the immovable attaching portion 13a, 13c denotes a holding portion extended from the base portion of the immovable attaching portion 13a and opposed to the escape prevention portion 13b with a fine space, 14a denotes a strip-shaped portion formed into the thin strip shape having the wide width from soft synthetic resin, rubber, paper or metal foil etc., and 14b denotes an attaching portion formed by folding back one end side of the strip-shaped portion 14a and fixedly attaching its end portion to the strip-shaped portion 14a by welding together or adhesion etc., and in which the immovably attaching portion 13a is fitted and inserted.

The hair dressing and beauty technique training device 11 constituted as above in Embodiment 2 of the present invention may be immovably attached by holding in a sandwiched manner the plate-shaped portion 15 formed on the strip-shaped portion 14 with the immovable attaching portion 13 composed of the clip, and subsequently may be fixedly attached by fitting the fixedly attaching portion 12 of the hair dressing and beauty technique training device 11 to the portion 105 to be fixedly attached formed in the section for haircut training etc., on the model 102 for hair dressing and beauty technique training. When the hair dressing and beauty technique training device 11 is fitted to the portion 105 to be fixedly attached, the first angle scale may be displayed around the portion 105 to be fixedly attached on the surface of the model main body 103 by fitting and inserting the tube portion 104 in the fitting insertion hole portion 107 in the indication plate 106.

When the training is carried out in another section, the hair dressing and beauty technique training device 11 is pulled out from the portion 105 to be fixedly attached, subsequently the indication plate 106 is removed, and the indication plate 106 and the hair dressing and beauty technique training device 11 are disposed in the portion 105 to be fixedly attached formed in another section. When the strip-shaped portion 14 is shortened by training for haircutting, the strip-shaped portion 14 may be exchanged for a new one.

The hair dressing and beauty technique training device 11a in a Modified Example may also be immovably attached by fitting and inserting the immovable attaching portion 13a to the attaching portion 14b formed on the strip-shaped portion 14a and subsequently may be fixedly attached by fitting the fixedly attaching portion 12 of the hair dressing and beauty technique training device 11 to the portion 105 to be fixedly attached formed in the section for haircut training etc., on the model 102 for hair dressing and beauty technique training. The first angle scale may be displayed around the portion 105 to be fixedly attached using the indication plate 106. The escape prevention portion 13b is formed in the immovable attaching portion 13a and the attaching portion 14b fitted and inserted in the immovable attaching portion 13a is held in a sandwiched manner with the holding portion 13c. Thus, it may be prevented that the strip-shaped portion 14a immovably attached to the immovable attaching portion 13a is removed during the training and the attaching portion 14b is turned around the immovable attaching portion 13a during the training. The attaching portion 14b may be reinforced with the immovable attaching portion 13a composed of the plate-shaped member to form the plate-shaped portion.

According to the hair dressing and beauty technique training device in Embodiment 2 constituted as above, the following actions may be obtained in addition to the actions described in Embodiment 1.

(1) Since the strip-shaped portion 14, 14a is formed detachably to the immovable attaching portion 13, 13a, when the strip-shaped portion 14, 14a is shortened by haircut training, only the strip-shaped portion 14, 14a may be exchanged for a new one. Thus, running costs may be reduced.

(2) Since the fixedly attaching portion 12 formed into a roughly spherical shape is turnable in the portion 105 to be fixedly attached in the tube portion 104, the trainees etc., may acquire changing the positions and posture of their body depending on the turning angle. Thus, the basic movement when the different cutting method is adopted in each section may be acquired.

(3) Since the plate-shaped portion is formed by inserting the attaching portion 14b of the strip-shaped portion 14a into the immovable attaching portion 13a formed from the plate-shaped member in the hair dressing and beauty technique training device 11a, the presence or absence of the twist or angle shift of the drawn strip-shaped portion 14a may be easily determined visually.

According to the model for hair dressing and beauty technique training in Embodiment 2 constituted as above, the following actions may be obtained.

(1) Since the plurality of portions 105 to be fixedly attached are formed in each section on the model main body 103, the posture and stance etc., in the cases of haircutting and winding in each section may be trained by mounting the hair dressing and beauty technique training device 11, 11a to the portions 105 to be fixedly attached in various sections.

(2) Since the first angle scale may be displayed around the portion 105 to be fixedly attached by mounting the indication plate 106 in the tube portion 104, the relationship of the angle of the strip-shaped portion 14, 14a with the position and posture of one's own body may be acquired.

Here, in the present embodiment, the cases where the fixedly attaching portion 12 of the hair dressing and beauty technique training device 11, 11a is fitted to the model main body 103 on which the portion 105 to be fixedly attached has been formed have been described, but if the fixedly attaching portion 12 is formed by a pin etc., even in the model main body 103 on which the portion 105 to be fixedly attached has not been formed, the fixedly attaching portion 12 may be fixedly attached by piercing the pin etc., at the surface of the model main body 103, and the same actions may be obtained.

Also, the cases where the portion 105 to be fixedly attached composed of the concave portion is formed on the model main body 103 have been described, but the portion 105 to be fixedly attached may be formed into a convex shape and the fixedly attaching portion 12 is formed into a concave shape to make them detachable. In these cases, the same actions may also be obtained.

The fixedly attaching portion 12 of the hair dressing and beauty technique training device 11, 11a may also be fitted to the fitting concave portion 5 in the joint portion 3 of the securing portion 2 in the hair dressing and beauty technique training device 1 described in Embodiment 1, and in this case, the same actions may also be obtained.

Also, the cases where the model main body 103 of the model 102 for hair dressing and beauty technique training is formed integrally with the head model have been described, but the model main body 103 is separately molded into a mask shape from synthetic resin or rubber etc., and is worn on the head model 100 described in Embodiment 1 so as to use it in some cases. In these cases, the action where the existing head model may be diverted may be obtained.

Embodiment 3

Figure 3:
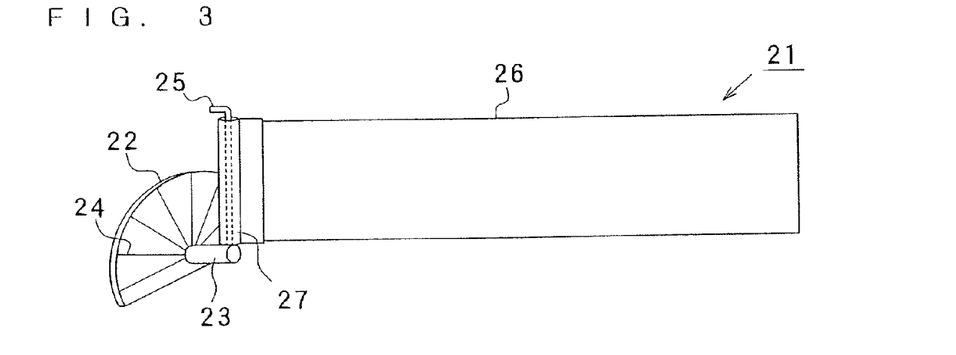
FIG. 3 is a perspective view of a hair dressing and beauty technique training device in Embodiment 3.

FIG. 3 is a perspective view of a hair dressing and beauty technique training device in Embodiment 3 of the present invention.

In the figure, reference numeral 21 denotes the hair dressing and beauty technique training device in Embodiment 3, 22 denotes a securing portion formed into a plane-shaped body of a roughly semicircular shape, 23 denotes a joint portion formed into a roughly L shape and whose one end is pivotally arranged turnably to the securing portion 22, 24 denotes a first angle scale radially displayed and evenly spaced with centering on the joint portion 23 on the surface of the securing portion 22, 25 denotes an escape prevention portion formed in a unciform shape at the end of the joint portion 23, 26 denotes a strip-shaped portion formed into the thin strip shape having the wide width from soft synthetic resin, rubber, paper or metal foil etc., and 27 denotes an attaching portion formed by folding back one end side of the strip-shaped portion 26 and fixedly attaching its end portion to the strip-shaped portion 26 by welding together or adhesion etc., and into which the joint portion 23 is inserted.

It is noted that, in the present embodiment, the joint portion 23 is fitted to the securing portion 22. Thus, if the joint portion 23 is gripped to move, it may be turned. However, even if the strip-shaped portion 26 is sandwiched and drawn, the force is difficult to be transmitted to the joint portion 23. Thus, the joint portion 23 is formed so that it may not turn.

In the hair dressing beauty technique training device 21 constituted as above in Embodiment 3 of the present invention, the trainees etc., who carryout the training of the hairdressing and beauty techniques secure the securing portion 22 of the hair dressing beauty technique training device 21 to the head model (not shown) by suction or adherence etc., and subsequently set the predetermined angle by turning the joint portion 23 to the horizontal direction. Then, the training of the hair dressing and beauty techniques may be carried out in the same way as that described in Embodiment 1.

According to the hair dressing beauty technique training device constituted as above in Embodiment 3, the following action may be obtained in addition to the actions described in Embodiment 1.

(1) The attaching portion 27 is formed in one end of the strip-shaped portion 26 and the constitution of the strip-shaped portion 26 which is a consumable article is simple. Thus, running costs may be reduced remarkably.

Embodiment 4

Figure 4:
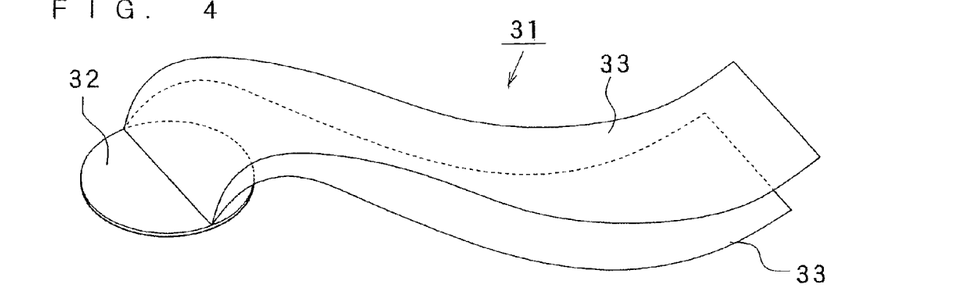
FIG. 4 is a perspective view of a hair dressing and beauty technique training device in Embodiment 4.

FIG. 4 is a perspective view of a hair dressing and beauty technique training device in Embodiment 4 of the present invention.

In the figure, reference numeral 31 denotes the hair dressing and beauty technique training device in Embodiment 4, 32 denotes a fixedly attaching portion formed into the roughly circle plane shape from soft synthetic resin or rubber etc., and 33 denotes a plurality of strip-shaped portions formed into the thin strip shape having the wide width from soft synthetic resin, rubber, paper or metal foil etc., and whose one ends are connected to the same base of the fixedly attaching portion 32.

The hair dressing and beauty technique training device 31 constituted as above in Embodiment 4 of the present invention may fixedly attach the fixedly attaching portion 32 detachably by adherence etc., to the head model (not shown) which is the same as that described in Embodiment 1.

It is noted that the method for using the hair dressing and beauty technique training device in Embodiment 4 is the same as that described in Embodiment 1. Thus, an explanation thereof is omitted.

According to the hair dressing beauty technique training device constituted as above in Embodiment 4, the following actions may be obtained in addition to the actions described in Embodiment 1.

(1) The plurality of strip-shaped portions 33 are connected to the fixedly attaching portion 32. Thus, since the overlapped strip-shaped portions 33 are thickened, the feel close to the thickness of a bundle of hair may be obtained.

(2) Since the constitution is simple, mass production is possible by reduced material costs.

Embodiment 5

Figure 5A:
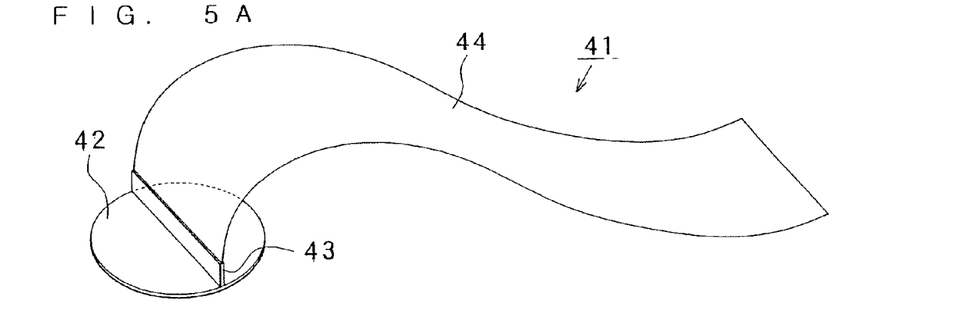
FIG. 5A is a perspective view of a hairdressing and beauty technique training device in Embodiment 5.
Figure 5B:
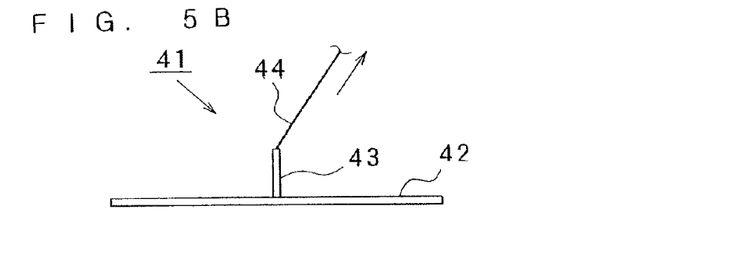
FIG. 5B is a side view of a hair dressing and beauty technique training device in Embodiment 5.

FIG. 5A is a perspective view of a hair dressing and beauty technique training device in Embodiment 5 of the present invention, and FIG. 5B is a side view of the hair dressing and beauty technique training device in Embodiment 5.

In the figures, reference numeral 41 denotes the hair dressing and beauty technique training device in Embodiment 5, 42 denotes a fixedly attaching portion formed into the roughly circle plane shape from soft synthetic resin or rubber etc., 43 denotes a hard plate-shaped portion formed from hard synthetic resin etc., and provided in the protruding manner roughly perpendicularly to the fixedly attaching portion 42, and 44 denotes a strip-shaped portion formed into the thin strip shape having the wide width from soft synthetic resin, rubber, paper or metal foil etc., and whose one end is secured to the plate-shaped portion 43.

The hair dressing and beauty technique training device 41 constituted as above in Embodiment 5 of the present invention may fixedly attach the fixedly attaching portion 42 detachably by adherence etc., to the head model (not shown) which is the same as that described in Embodiment 1.

The method for using the hair dressing and beauty technique training device in Embodiment 5 is the same as that described in Embodiment 1. When the strip-shaped portion 44 is pulled up straightforward to the plate-shaped portion 43 or when the strip-shaped portion 44 is pulled up obliquely to the plate-shaped portion 43 (see FIG. 5B), by improving the posture and stance etc., so as not to twist or loosen the strip-shaped portion 44 and not to shift the angle of the strip-shaped portion 44 to the horizontal direction, it is possible to acquire the posture and stance etc., for proper haircutting in each case of gradation, same layer and high layer etc.

According to the hair dressing beauty technique training device constituted as above in Embodiment 5, the following action may be obtained in addition to the actions described in Embodiment 1.

(1) The plate-shaped portion 43 is provided in a hanging manner in the fixedly attaching portion 42. Thus, the trainees themselves may easily determine visually the presence or absence of twist or angle shift of the drawn strip-shaped portion 44 on the basis of the plate-shaped portion 43, and therefore training efficiency may be enhanced.

Embodiment 6

Figure 6A:
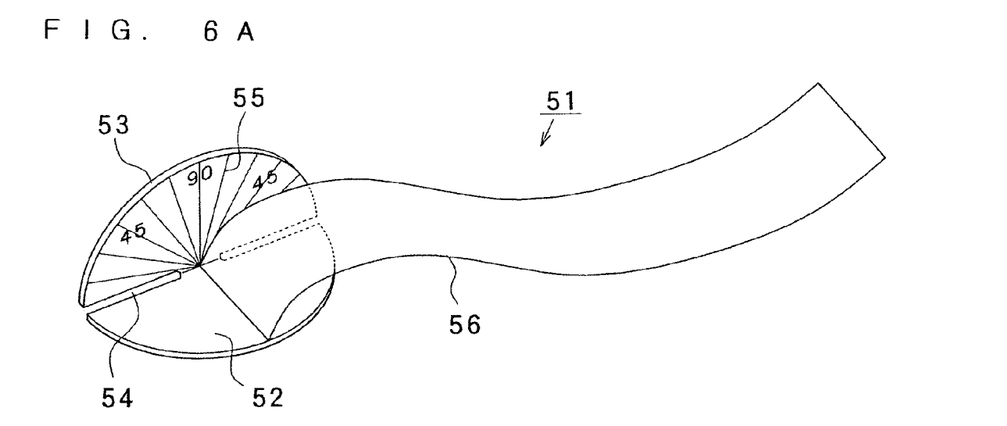
FIG. 6A is a perspective view of a hair dressing and beauty technique training device in Embodiment 6.
Figure 6B:
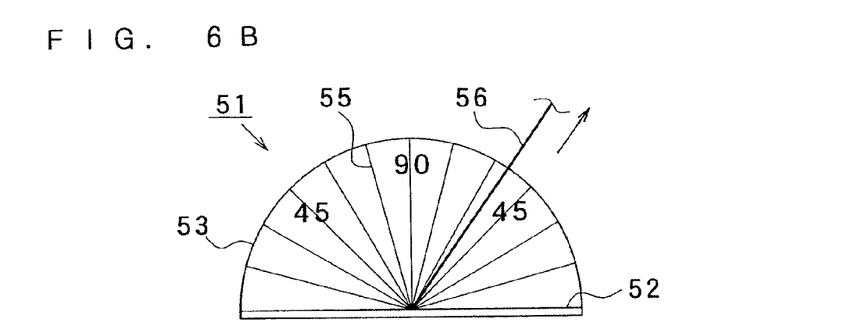
FIG. 6B is a front view of a hair dressing and beauty technique training device in Embodiment 6.

FIG. 6A is a perspective view of a hair dressing and, beauty technique training device in Embodiment 6 of the present invention, and FIG. 6B is a front view of the hair dressing and beauty technique training device in Embodiment 6.

In the figures, reference numeral 51 denotes the hair dressing and beauty technique training device in Embodiment 6, 52 denotes a fixedly attaching portion formed into the plane-shaped body of the roughly semicircular shape from soft synthetic resin or rubber etc., having flexibility, 53 denotes an indication plate of the roughly semicircular shape provided in a standing manner to the one side of the fixedly attaching portion 52, 54 denotes a cut line portion formed from both edges at the border of the fixedly attaching portion 52 and the indication plate 53, and 55 denotes a second angle scale evenly spaced and radially displayed from a lower end of the indication plate 53. In the present embodiment, the second angle scale 55 is displayed with 15° increments, and numerical values of 45° and 90° are also displayed. Reference numeral 56 denotes the strip-shaped portion formed into a thin strip shape having the wide width from soft synthetic resin, rubber, paper or metal foil etc., and whose one end is connected to the fixedly attaching portion 52 in a radial center position of the second angle scale 55.

The hair dressing and beauty technique training device 51 constituted as above in Embodiment 6 of the present invention may fixedly attach the fixedly attaching portion 52 detachably by adherence etc., to the head model (not shown).

The method for using the hair dressing and beauty technique training device in Embodiment 6 is the same as that described in Embodiment 1. When the strip-shaped portion 56 is pulled up, as in FIG. 6B, the angle of the strip-shaped portion 56 to the fixedly attaching portion 52 may be confirmed by the second angle scale. By improving the posture and stance etc., when the strip-shaped portion 56 is pulled up at each angle, it is possible to acquire the posture and stance etc., for proper haircutting in each case of gradation, same layer and high layer etc.

According to the hair dressing beauty technique training device constituted as above in Embodiment 6, the following actions may be obtained in addition to the actions described in Embodiment 1.

(1) Because of including the indication plate 53 provided in a standing manner to the fixedly attaching portion 52 and provided in addition laterally to the strip-shaped portion 56, and the second angle scale 55 displayed on the indication plate 53, when the training is carried out by assuming that the angle to draw hair is changed or hair is drawn at a constant angle, it may be understood what angle the hair is drawn at, and thus the relationship of the angle to draw with the posture and stance may be acquired.

(2) Because of including the cut line portion 54 formed from both edges at the border of the fixedly attaching portion 52 and the indication plate 53, the fixedly attaching portion 52 may be adhered along the curved surface of the head model without being restricted to the indication plate 53.

Here, in the present embodiment, the cases where the indication plate 53 is provided in a standing manner to the fixedly attaching portion 52 have been described, but when the hair dressing and beauty technique training device 21 described in Embodiment 3 is provided with the indication plate 53, the indication plate 53 may be fixedly attached to the joint portion 23 at the position of 90°, thereby being capable of providing the indication plate 53 in addition laterally to the strip-shaped portion 26. When the hair dressing and beauty technique training device 1 described in Embodiment 1 is provided with the indication plate 53, the indication plate 53 may be fixedly attached at the periphery of the plate-shaped portion 7 at the position of 90°, thereby being capable of providing the indication plate 53 in addition laterally to the strip-shaped portion 8.

Embodiment 7

Figure 7A:
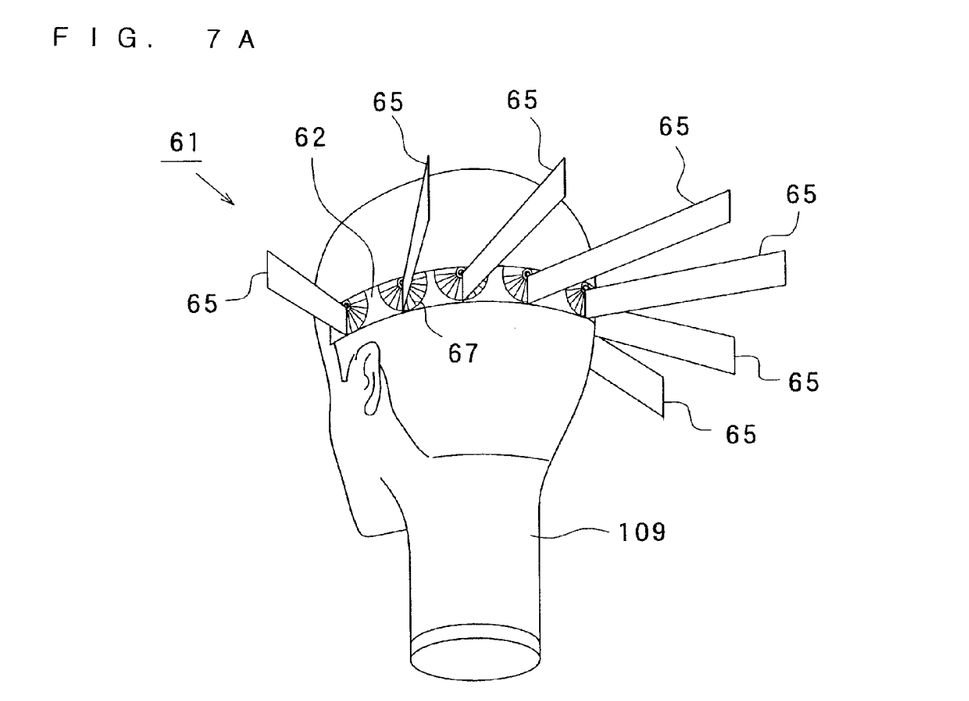
FIG. 7A is a perspective view showing a state where a hair dressing and beauty technique training device in Embodiment 7 is mounted on a head model.
Figure 7B:
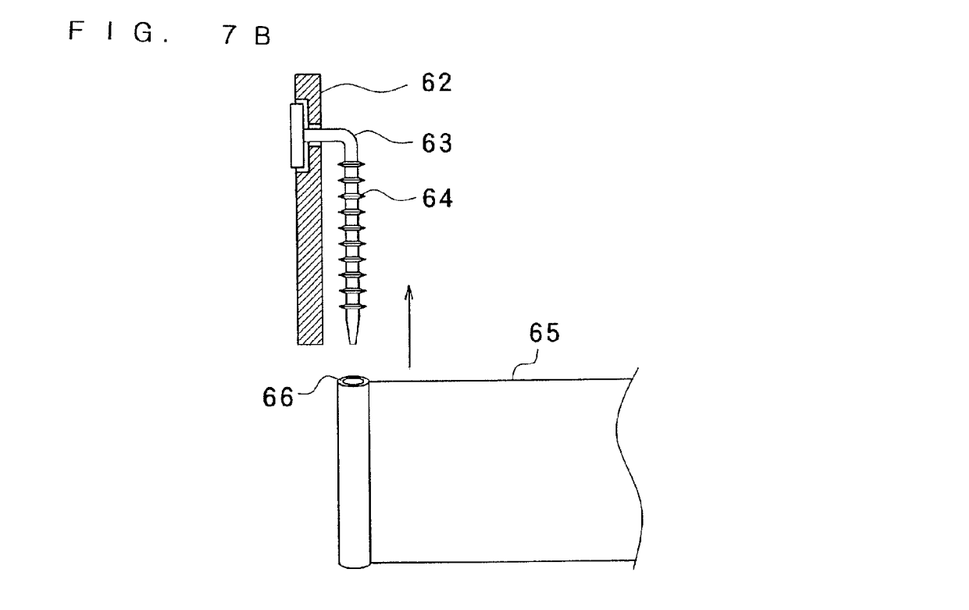
FIG. 7B is a substantial part cross-sectional view of the hair dressing and beauty technique training device.

FIG. 7A is a perspective view showing a state where a hair dressing and beauty technique training device in Embodiment 7 of the present invention has been mounted on a head model, and FIG. 7B is a substantial part cross-sectional view of the hair dressing and beauty technique training device.

In the figures, reference numeral 61 denotes the hair dressing and beauty technique training device in Embodiment 7, 62 denotes a securing portion formed into a strip shape from soft synthetic resin, rubber or paper etc., having flexibility and secured to the head model 109 by adherence etc., 63 denotes a joint portion formed into a roughly L shape and whose one end is pivotally arranged turnably to the securing portion 62 with an appropriate space, 64 denotes an escape prevention portion formed in the joint portion 63 at another end side arranged roughly parallel with the securing portion 62 and composed of a plurality of convex portions, 65 denotes a strip-shaped portion formed into a thin strip shape having the wide width from soft synthetic resin, rubber, paper or metal foil etc., 66 denotes a tube-shaped attaching portion formed at the one end side of the strip-shaped portion 65 and into which the joint portion 63 is inserted, and 67 denotes a first angle scale evenly spaced and displayed radially with centering on the joint portion 63 on the surface of the securing portion 62.

According to the hair dressing beauty technique training device constituted as above in Embodiment 7, the following actions may be obtained in addition to the actions described in Embodiment 1 and Embodiment 3.

(1) The plurality of strip-shaped portions 65 are secured with appropriate spaces to the securing portion 62 formed into the strip shape. Thus, the plurality of strip-shaped portions 65 may be fixedly attached by mounting one hair dressing and beauty technique training device 61 to the head model 109, and this is excellent in handling properties.

(2) Various sites of the securing portion 62 are provided with the strip-shaped portions 65. Thus, total training may be carried out by haircut training etc., at various sites at a time.

Embodiment 8

Figure 8A:
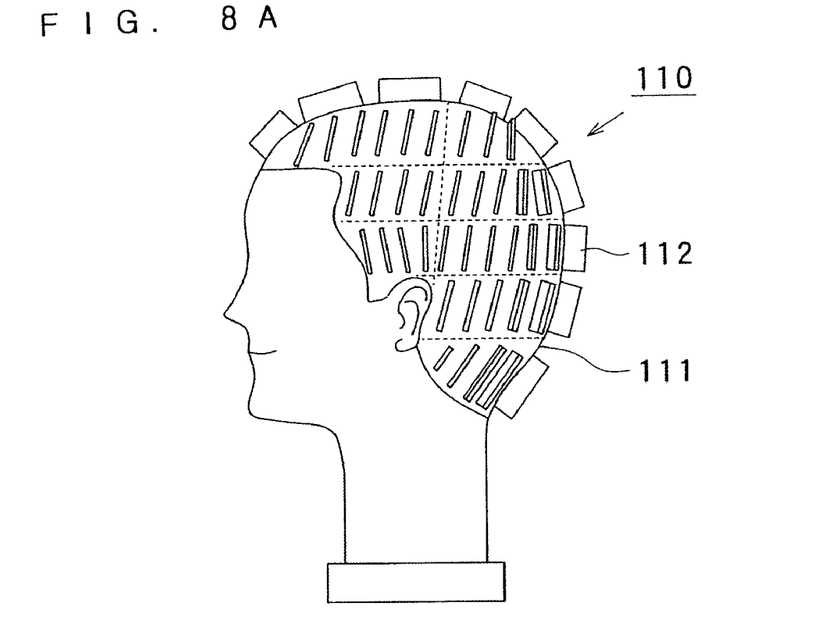
FIG. 8A is a side view of a model for hair dressing and beauty technique training in Embodiment 8.
Figure 8B:
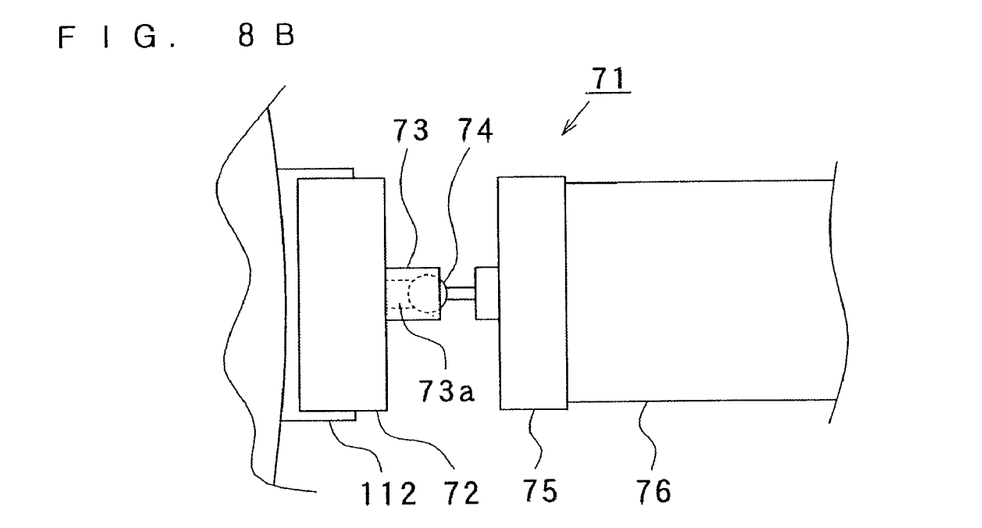
FIG. 8B is a substantial part side view of the hair dressing and beauty technique training device in Embodiment 8.

FIG. 8A is a side view of a model for hair dressing and beauty technique training in Embodiment 8 of the present invention, and FIG. 8B is a substantial part side view of a hair dressing and beauty technique training device in Embodiment 8 of the present invention.

In FIG. 8A, reference numeral 110 denotes the model for hair dressing and beauty technique training composed of the head model in Embodiment 8, 111 denotes a model main body of the head model of the model 110 for hair dressing and beauty technique training, and 112 denotes portions to be fixedly attached provided in a hanging manner in each section of the front, the top, the side and the nape etc., of the model main body 111 with appropriate spaces and composed of a plurality of protruding ridge portions.

In FIG. 8B, reference numeral 71 denotes the hair dressing and beauty technique training device in Embodiment 8, 72 denotes a fixedly attaching portion composed of the clip fixedly attached by holding in a sandwiched manner the portion 112 to be fixedly attached provided in a standing manner on the model 110 for hair dressing and beauty technique training, 73 denotes a joint portion formed into a convex shape in the fixedly attaching portion 72, 74 denotes a fitting portion of a roughly spherical shape formed turnably to fit to a concave portion 73a formed in the joint portion 73 and, 75 denotes an immovable attaching portion composed of the clip extended to the fitting portion 74 and joined to the fixedly attaching portion 72, and 76 denotes a strip-shaped portion formed into the thin strip shape having the wide width from soft synthetic resin, rubber, paper or metal foil etc., and held with the immovable attaching portion 75 to be immovably attached.

The hair dressing and beauty technique training device 71 constituted as above in Embodiment 8 of the present invention may be immovably attached by holding in a sandwiched manner the strip-shaped portion 76 with the immovable attaching portion 75 composed of the clip and subsequently may be fixedly attached by holding in a sandwiched manner the portion 112 to be fixedly attached formed on the section for haircut training etc., on the model 110 for hair dressing and beauty technique training with the fixedly attaching portion 72 in the hair dressing and beauty technique training device 71. By turning the immovable attaching portion 75 against the fixedly attaching portion 72 using the fitting portion 74, the angle in the horizontal direction of the strip-shaped portion 76 may be changed.

When the training in another section is carried out, the fixedly attaching portion 72 in the hair dressing and beauty technique training device 71 is removed from the portion 112 to be fixedly attached, and the hair dressing and beauty technique training device 71 is disposed in the portion 112 to be fixedly attached formed in another section. When the strip-shaped portion 76 is shortened by haircut training, the new strip-shaped portion 76 may be immovably attached to the clip of the immovable attaching portion 75.

According to the hair dressing beauty technique training device constituted as above in Embodiment 8, the following actions may be obtained in addition to the actions described in Embodiment 1.

(1) The strip-shaped portion 76 is formed detachably to the immovable attaching portion 75. Thus, when the strip-shaped portion 76 is shortened by haircut training, only the strip-shaped portion 76 may be exchanged for a new one to reduce running costs.

(2) The immovable attaching portion 75 is formed turnably to the fixedly attaching portion 72. Thus, when the angle of the strip-shaped portion 76 in the horizontal direction may be changed, it may be acquired that the position and posture of one's own body are changed depending on the angle of the strip-shaped portion 76, and the basic movement when a different cutting method is adopted in each section may be acquired.

(3) The one end side of the strip-shaped portion 76 is held and immovably attached with the immovable attaching portion 75 having the wide width. Thus, the presence or absence of twist or angle shift of the drawn strip-shaped portion 76 may be easily determined visually on the basis of the immovable attaching portion 75.

According to the model for hair dressing and beauty technique training constituted as above in Embodiment 8, the following action may be obtained.

(1) The plurality of portions 112 to be fixedly attached are formed in each section on the model main body 111. Thus, training for posture and stance etc., for haircutting and winding in each section may be made by mounting the hair dressing and beauty technique training device 71 to the portion 112 to be fixedly attached in various sections.

Here, in the present embodiment, the cases where the model main body 111 of the model 110 for hair dressing and beauty technique training is formed integrally with the head model have been described, but the model main body 111 is molded from synthetic resin or rubber etc., and is worn on the head model 100 described in Embodiment 1 so as to use it in some cases. In these cases, the action where the existing head model 100 may be diverted may be obtained.

Figure 9A:
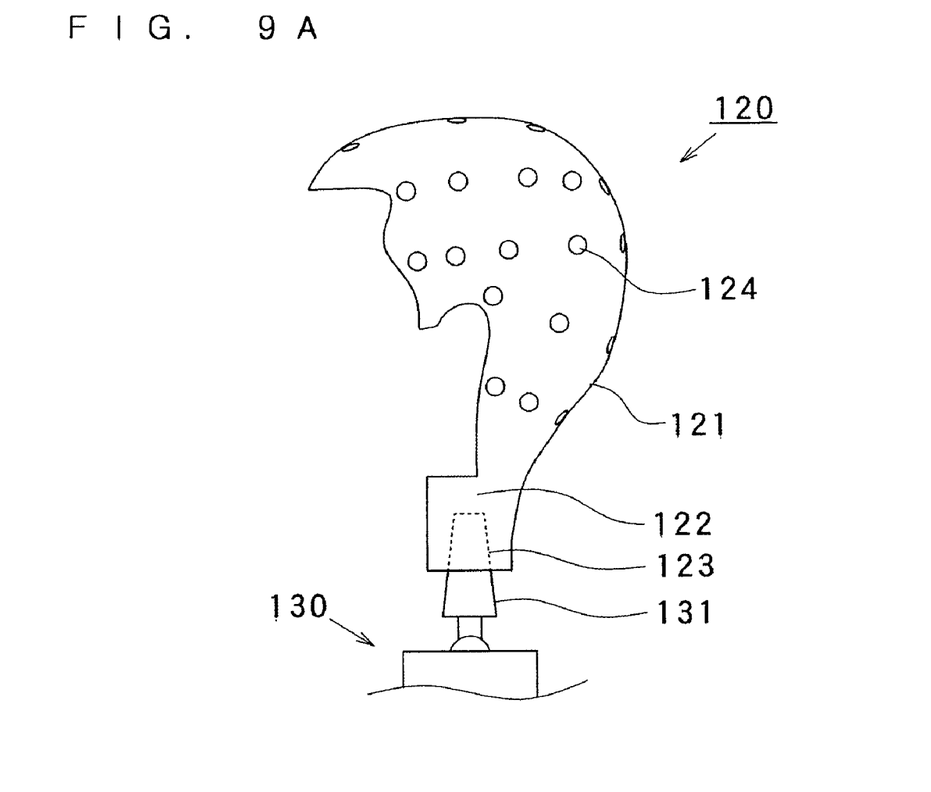
FIG. 9A is a side view of a model for hair dressing and beauty technique training in Embodiment 9.
Figure 9B:
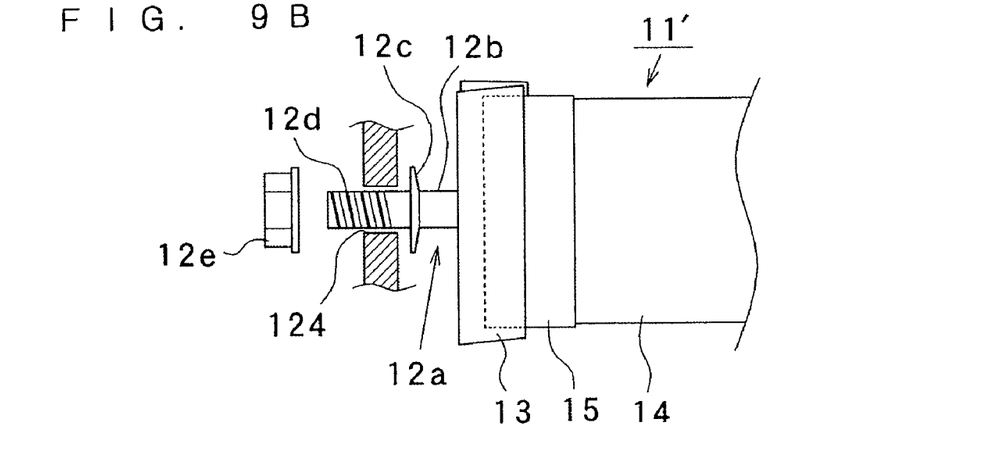
FIG. 9B is a substantial part cross-sectional view showing a state where the hair dressing and beauty technique training device of another Modified Example in Embodiment 2 has been fixedly attached to the model for hair dressing and beauty technique training in Embodiment 9.

FIG. 9A is a side view of a model for hair dressing and beauty technique training in Embodiment 9 of the present invention, and FIG. 9B is a substantial part cross-sectional view showing a state where the hair dressing and beauty technique training device of another Modified Example in Embodiment 2 has been fixedly attached to the model for hair dressing and beauty technique training in Embodiment 9 of the present invention. It is noted that for the same components as those described in Embodiment 2, the same numerals and letters are given and explanations thereof are omitted.

In FIG. 9A, reference numeral 120 denotes the model for hair dressing and beauty technique training composed of the head model in Embodiment 9, 121 denotes a model main body of the head model formed from a thin-walled synthetic resin or metal from the hair line to the back of the head and the nape in a roughly bowl shape, 122 denotes a base portion extended to the nape of the model main body 121, 123 denotes a supporting head fitting insertion hole portion formed in the base portion 122 and in which a supporting head 131 of a mounting table 130 described later is fitted and inserted, 124 denotes a portion to be fixedly attached composed of a hole portion formed on the model main body 121, 130 denotes the existing mounting table to which an existing wig etc., for training may also be attached, and 131 denotes the supporting head provided in a standing manner on the mounting table 130.

In FIG. 9B, reference numeral 11' denotes the hair dressing and beauty technique training device of another Modified Example in Embodiment 2, 12a denotes a fixedly attaching portion of the hair dressing and beauty technique training device 11' fixedly attached detachably to the portion 124 to be fixedly attached in the model 120 for hair dressing and beauty technique training, 12b denotes an axis portion whose one end is fixedly attached to the immovable attaching portion 13 and other end side is inserted into the portion 124 to be fixedly attached, 12c denotes a flange portion formed in the axis portion 12b to have a larger external diameter than a hole diameter of the portion 124 to be fixedly attached, 12d denotes a screw portion formed with a threaded hole in an outer peripheral plane of the axis portion 12b, and 12e denotes a fastening member screwed to the screw portion 12d.

In the model 120 for hair dressing and beauty technique training constituted as above in Embodiment 9, the hair dressing and beauty technique training device 11' may be fixedly attached detachably because the axis portion 12b of the fixedly attaching portion 12a in the hair dressing and beauty technique training device 11' is inserted into the portion 124 to be fixedly attached and the fastening member 12e is screwed to the screw portion 12d of the axis portion 12b. When the angle of the strip-shaped portion 14 in the horizontal direction is changed, the fastening member 12e is loosened, and subsequently the axis portion 12b is turned to change the angle of the strip-shaped portion 14, and the fastening member 12e is fastened again to make it possible to change the angle of the strip-shaped portion 14.

Since the model 120 for hair dressing and beauty technique training in Embodiment 9 is constituted as above, the following actions may be obtained.

(1) The model main body 121 of the model 120 for hair dressing and beauty technique training is formed into a thin-walled and roughly bowl shape from the hair line to the back of the head. Thus, the hair dressing and beauty technique training device 11' may be secured with the fastening member 12e by placing the hand from the backside of the model 120 for hair dressing and beauty technique training, and thus the model main body 121 is excellent in flexibility.

(2) The model main body 121 of the model 120 for hair dressing and beauty technique training is formed into a thin-walled and roughly bowl shape from the hair line to the back of the head. Thus, the model main body 121 is excellent in moldability, is light in weight, and may be easily carried about.

It is noted that, in the present embodiment, the cases where the portion 124 to be fixedly attached composed of the hole portion has been formed on the model 120 for hair dressing and beauty technique training have been described, but in place of the hole portion, the portion to be fixedly attached composed of the concave portion described in Embodiment 2 or the portion to be fixedly attached composed of the convex portion described in Embodiment 8 is also formed and used in some cases. Also, the cases where the axis portion 12b of the hair dressing and beauty technique training device 11' is inserted into the portion 124 to be fixedly attached composed of the hole portion in the model 120 for hair dressing and beauty technique training and the hair dressing and beauty technique training device 11' is fastened and secured with the fastening member 12e have been described. However, in place of the fastening member 12e, the hair dressing and beauty technique training device 11' is secured in some cases by holding in a sandwiched manner the axis portion 12b with the clip etc., from the backside of the model 120 for hair dressing and beauty technique training. Also, in place of the fixedly attaching portion 12a in the hair dressing and beauty technique training device 11', the hair dressing and beauty technique training device 11' is secured in some cases by inserting the fixedly attaching portion 12 formed into a roughly spherical shape in the hair dressing and beauty technique training device 11 described in Embodiment 2. Those where the screw portion is formed at an internal peripheral plane of the portion 124 to be fixedly attached composed of the hole portion in the model 120 for hair dressing and beauty technique training and the screw portion screwed with the above screw portion is formed in the fixedly attaching portion or the securing portion in the hair dressing and beauty technique training device are also used in some cases. In the cases as above, the same actions as those of the model for hair dressing and beauty technique training described in Embodiment 9 may also be obtained.

INDUSTRIAL APPLICABILITY

The present invention relates to the hair dressing and beauty technique training device and the model for hair dressing and beauty technique training used when training for haircutting and winding is carried out, and may provide the hair dressing and beauty technique training device having the following actions. The presence or absence of twist or angle shift when drawn by sandwiching hair between the fingers is easily found. Thus, the proper postures etc., for haircutting and winding may be determined by oneself, further the proper posture and stance so as not to cause twist or angle shift may be acquired and one's habits and what techniques he/she lacks may be determined objectively. Thus, basic techniques for proper haircutting and winding may be acquired in a short period of time. The instructors may also teach basic techniques objectively, and effective instruction is possible. Furthermore, when artificial hair runs out, if hair is exchanged for new hair, the head model may be used repeatedly to reduce running costs. Also, the present invention may provide the model for hair dressing and beauty technique training to which the hair dressing and beauty technique training device may be attached for training basic techniques for haircutting and winding.

The invention claimed is:

1. A hair dressing and beauty technique training device, comprising a fixedly attaching portion fixedly attached by being fitted or inserted detachably to, and rotatable about, a portion to be fixedly attached, composed of a concave portion or convex portion formed on a surface of a head model, and one or a plurality of strip-shaped portions whose one end is connected to the fixedly attaching portion.

2. The hair dressing and beauty technique training device according to claim 1, comprising an immovable attaching portion which is extended or joined to the fixedly attaching portion, wherein the strip-shaped portion is immovably attached detachably to the immovable attaching portion.

3. The hair dressing and beauty technique training device according to claim 1, comprising an angle scale which is displayed around the portion to be fixedly attached on the surface of the head model.

4. The hair dressing and beauty technique training device according to claim 1, comprising an indication plate provided laterally to the strip-shaped portion and an angle scale displayed on the indication plate.

5. A hair dressing and beauty technique training device, comprising a fixedly attaching portion fixedly attached detachably to a surface of a head model by holding in a sandwiched manner a portion to be fixedly attached formed of a protruding ridge portion, a joint portion formed in the fixedly attaching portion, and one or a plurality of strip-shaped portions whose one end is fitted to and connected turnably to the joint portion.

6. The hair dressing and beauty technique training device according to claim 5, comprising an immovable attaching portion which is extended or joined to the joint portion, wherein the strip-shaped portion is immovably attached detachably to the immovable attaching portion.

7. The hair dressing and beauty technique training device according to claim 5, comprising an angle scale which is displayed around the portion to be fixedly attached on the surface of the head model.

8. The hair dressing and beauty technique training device according to claim 5, comprising an indication plate provided laterally to the strip-shaped portion and an angle scale displayed on the indication plate.

9. A model for hair dressing and beauty technique training using a hair dressing and beauty technique training device comprising:
   (a) a model for hair dressing and beauty technique training comprising a head model, and a portion to be fixedly attached being formed of one of concave portions or convex portions, in a plurality of sites on a surface of the head model; and
   (b) a hair dressing and beauty technique training device comprising:
   a fixedly attaching portion fixedly attached by being fitted or inserted detachably to, and rotatable about, the portion to be fixedly attached, composed of the concave portions or convex portions formed on the surface of the head model, and one or a plurality of strip-shaped portions whose one end is connected to the fixedly attaching portion.

10. A model for hair dressing and beauty technique training using a hair dressing and beauty technique training device comprising:
   (a) a model for hair dressing and beauty technique training comprising a head model, and a portion to be fixedly attached being formed of protruding ridge portions in a plurality of sites on a surface of the head model; and
   (b) a hair dressing and beauty technique training device comprising:
   a fixedly attaching portion fixedly attached detachably to the surface of the head model by holding in a sandwiched manner the portion to be fixedly attached formed of the protruding ridge portion,
   wherein a joint portion is formed in the fixedly attaching portion, and one end of one or a plurality of strip-shaped portions is fitted to and connected turnably to the joint portion.

* * * * *